US010012012B2

(12) United States Patent
Alexander et al.

(10) Patent No.: US 10,012,012 B2
(45) Date of Patent: Jul. 3, 2018

(54) LATCHING DEVICE FOR SELECTIVELY LATCHING AND UNLATCHING A CLOSURE OF A VEHICLE

(71) Applicant: GM GLOBAL TECHNOLOGY OPERATIONS LLC, Detroit, MI (US)

(72) Inventors: Paul W. Alexander, Ypsilanti, MI (US); Robert Dallos, Jr., Canton, MI (US); Roger Herbert Culver, Rochester Hills, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 808 days.

(21) Appl. No.: 14/464,043

(22) Filed: Aug. 20, 2014

(65) Prior Publication Data

US 2015/0052728 A1    Feb. 26, 2015

Related U.S. Application Data

(60) Provisional application No. 61/869,251, filed on Aug. 23, 2013.

(51) Int. Cl.
*E05B 47/00*    (2006.01)
*E05B 83/34*    (2014.01)
(Continued)

(52) U.S. Cl.
CPC .......... *E05B 83/34* (2013.01); *E05B 47/0009* (2013.01); *B60K 2015/0576* (2013.01);
(Continued)

(58) Field of Classification Search
CPC ................. E05B 83/34; E05B 47/0009; B60K 2015/0576; Y10S 292/04; Y10T 29/49826; E05C 3/12
(Continued)

(56) References Cited

U.S. PATENT DOCUMENTS 3,834,747 A * 9/1974 Slovensky, Jr. ........ E05B 53/003
292/38
3,910,611 A * 10/1975 Slovensky, Jr. ........ E05B 53/003
292/38

(Continued)

FOREIGN PATENT DOCUMENTS

CN    1884779 A    12/2006
CN    201068684 Y    6/2008
(Continued)

*Primary Examiner* — Bayan Salone
(74) *Attorney, Agent, or Firm* — Quinn IP Law

(57) ABSTRACT

A method includes assembling a first latching device and a second latching device. The first latching device includes a first support housing and a first sliding assembly. The first sliding assembly is selectively movable, relative to the first support housing, between a latched position and an unlatched position. The second latching device includes a second support housing, a second sliding assembly, and an actuating mechanism. The second support housing is substantially identical to the first support housing. The second sliding assembly is selectively movable, relative to the second support housing, between a latched position and an unlatched position. The actuating mechanism is operatively disposed in the second support housing and is configured to selectively maintain the sliding assembly in the latched position until the actuating mechanism is selectively actuated. The first latching device does not include the actuating mechanism.

3 Claims, 5 Drawing Sheets

(51) Int. Cl.
    *E05B 85/24*     (2014.01)
    *E05C 3/12*     (2006.01)
    *B60K 15/05*     (2006.01)

(52) U.S. Cl.
    CPC ............... *E05C 3/12* (2013.01); *Y10S 292/04* (2013.01); *Y10T 29/49826* (2015.01)

(58) Field of Classification Search
    USPC .......................... 29/428; 292/302; 70/15–17
    See application file for complete search history.

(56) References Cited

U.S. PATENT DOCUMENTS

| | | | |
|---|---|---|---|
| 4,378,684 A | 4/1983 | Dugan et al. | |
| 4,648,252 A * | 3/1987 | Dugan | E05B 65/0811 292/DIG. 46 |
| 4,824,153 A * | 4/1989 | Dugan | E05B 65/0811 292/241 |
| 6,457,749 B1 * | 10/2002 | Heijnen | E21B 23/02 285/307 |
| 6,742,761 B2 * | 6/2004 | Johnson | F16K 31/566 251/11 |
| 7,354,289 B2 * | 4/2008 | Cannon | G01R 1/06788 439/314 |
| 7,585,006 B2 * | 9/2009 | Alacqua | A47L 15/4259 292/244 |
| 7,709,995 B2 * | 5/2010 | Hanlon | B60N 2/3011 297/330 |
| 7,797,933 B2 * | 9/2010 | Mankame | F15B 21/045 60/329 |
| 8,056,335 B1 * | 11/2011 | Brown | F03G 7/065 60/528 |
| 8,104,278 B2 * | 1/2012 | Browne | A45B 25/143 60/527 |
| 9,140,243 B2 * | 9/2015 | Gandhi | F03G 7/065 |
| 2003/0214746 A1 * | 11/2003 | Oh | G11B 19/22 360/74.1 |
| 2007/0281532 A1 * | 12/2007 | Cannon | G01R 1/06788 439/318 |
| 2009/0079205 A1 * | 3/2009 | Nishida | B60N 3/083 292/166 |
| 2009/0195121 A1 * | 8/2009 | Hanlon | B60N 2/3011 310/307 |
| 2009/0241537 A1 * | 10/2009 | Browne | A45B 25/143 60/527 |

FOREIGN PATENT DOCUMENTS

| | | |
|---|---|---|
| CN | 102086741 A | 6/2011 |
| CN | 201896508 U | 7/2011 |

\* cited by examiner

LATCHING DEVICE FOR SELECTIVELY LATCHING AND UNLATCHING A CLOSURE OF A VEHICLE

CROSS-REFERENCE TO RELATED APPLICATIONS

This application claims the benefit of U.S. Provisional Application No. 61/869,251, filed Aug. 23, 2013, which is hereby incorporated by reference in its entirety.

TECHNICAL FIELD

The present disclosure is related to a latching device for selectively latching and unlatching a closure of a vehicle.

BACKGROUND

A vehicle generally includes a fuel filler door covering a fill tube and gas cap. A latch mechanism may be disposed on the vehicle to latch and unlatch the fuel filler door. The latch mechanism typically employs numerous mechanical parts, such as screws, levers and two latch arms that are engaged to hold the door in a closed position.

SUMMARY

One aspect of the disclosure provides a method of assembling a plurality of latching devices. The method includes assembling a first latching device that includes a first support housing, defining a chamber, and a first sliding assembly, movably supported by the first support housing. The first sliding assembly is selectively movable within the chamber, between a latched position and an unlatched position. The method also includes assembling a second latching device that includes a second support housing, defining a chamber, a second sliding assembly, movably supported by the second support housing, and an actuating mechanism. The second support housing is substantially identical to the first support housing. The second sliding assembly is selectively movable within the chamber, between a latched position and an unlatched position. The actuating mechanism is operatively disposed in the second support housing and is configured to selectively maintain the sliding assembly in the latched position until the actuating mechanism is selectively actuated. The configuration of the first latching device does not include the actuating mechanism.

In another aspect of the disclosure, a method of providing a selective configured of a latching device is provided. The method includes maintaining an inventory of components, including a plurality of support housings, a plurality of sliding assemblies, and an actuating mechanism. The plurality of support housings are substantially identical to one another. One of the support housings is configurable in a first configuration to provide a first latching device and another one of the plurality of support housings is configurable in a second configuration to provide a second latching device. In the first configuration, the one of the support housings is configured to receive one of the sliding assemblies such that the sliding assembly is movable, relative to the support housing, between a latched position and an unlatched position. In the second configuration, one of the support housings is configured to receive one of the sliding assemblies such that the sliding assembly is movable, relative to the support housing, between the latched position and the unlatched position. The actuating mechanism is configured to selectively maintain the sliding assembly in the latched position until the actuating mechanism is selectively actuated. The first configuration of the first latching device does not include the actuating mechanism.

In yet another aspect of the disclosure, a method of assembling vehicles is provided. The method includes providing a first vehicle including a first fuel assembly. The first fuel assembly includes a first housing, a first closure, and a first latching device. The first closure extends from the first housing and is movable between an open position and a closed position. The first closure includes a first latch finger. The first latching device is configured for selectively grasping the first latch finger of the first closure. The first latching device has a first support housing and a first sliding assembly. The first support housing defines a chamber. The first sliding assembly is movably supported by the first support housing. The first sliding assembly is selectively movable within the chamber, between a latched position and an unlatched position. The first sliding assembly is configured to grasp the first latch finger in the latched position. The first sliding assembly is configured to not grasp the first latch finger when in the unlatched position. The method also includes providing a second vehicle including a second fuel assembly. The second fuel assembly includes a second housing, a second closure, and a second latching device. The second closure extends from the second housing and is movable between an open position and a closed position, wherein the second closure includes a second latch finger. The second latching device is configured for selectively grasping the second latch finger of the second closure. The second latching device has a second support housing, a second sliding assembly, and an actuating mechanism. The second support housing defines a chamber. The second sliding assembly is movably supported by the second support housing. The second sliding assembly is selectively movable within the chamber, between a latched position and an unlatched position. The second sliding assembly is configured to grasp the second latch finger in the latched position. The second sliding assembly is configured to not grasp the first latch finger when in the unlatched position. The actuating mechanism is operatively disposed in the second support housing and is configured to selectively maintain the sliding assembly in the latched position until the actuating mechanism is selectively actuated. The first latching device does not include the actuating mechanism.

The above features and advantages and other features and advantages of the present disclosure are readily apparent from the following detailed description of the best modes for carrying out the disclosure when taken in connection with the accompanying drawings.

DETAILED DESCRIPTION

Figure 1:
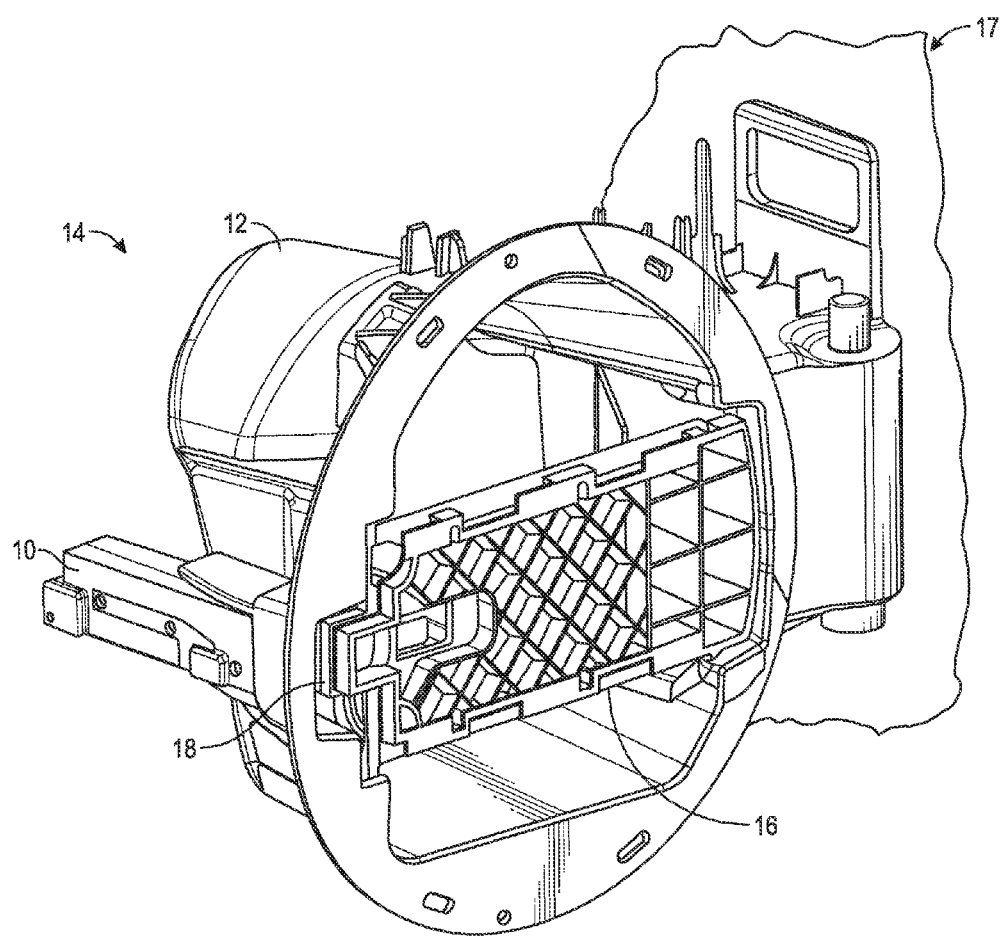
FIG. 1 is a schematic perspective view of a fuel assembly including a latching device and a closure.
Figure 2:
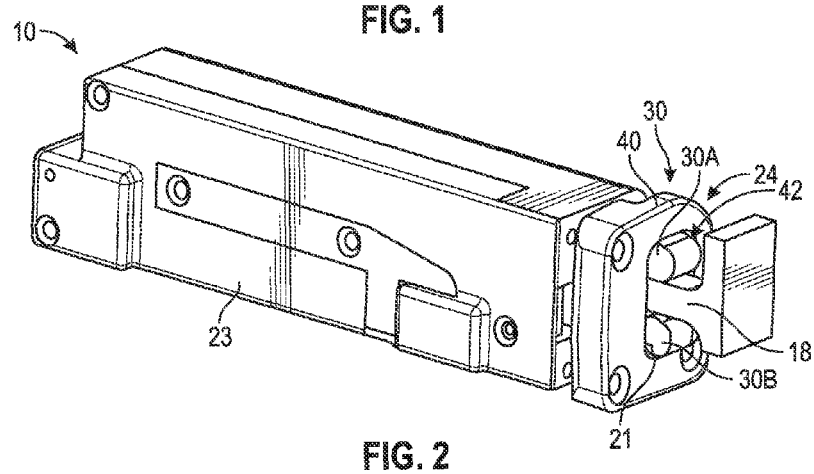
FIG. 2 is a schematic perspective view of the latching device of FIG. 1 with the latching device in a latched position.
Figure 3:
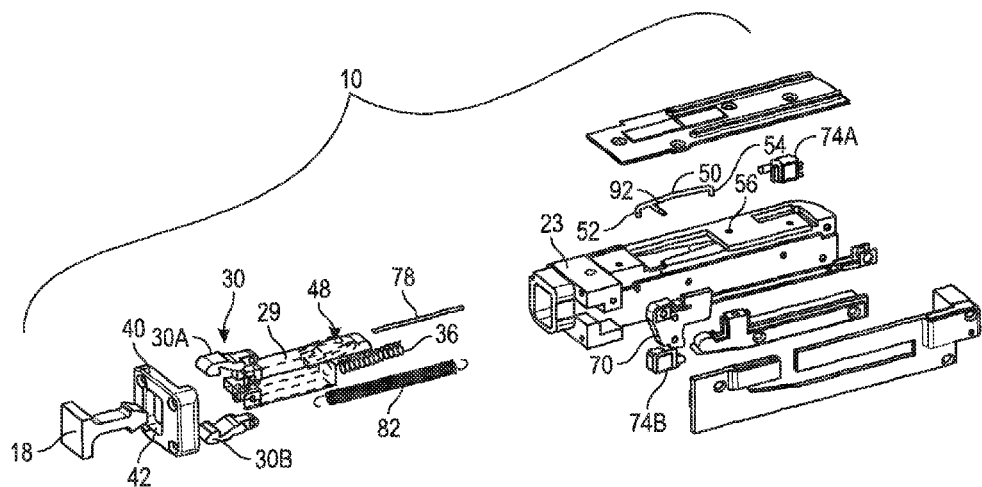
FIG. 3 is a schematic exploded perspective view of the latching device of FIGS. 1 and 2.

Referring to the drawings, wherein like reference numbers refer to like components throughout the several Figures, a latching device, configured for selectively maintaining a closure 16 of a vehicle 17 in a closed position, is shown schematically in FIGS. 1 and 2 at 10.

Referring to FIG. 1, a fuel assembly is shown at 14. The fuel assembly 14 includes a housing 12, the latching device 10, and the closure 16. The closure 16 movably extends from the housing 12 and is movable between an open position and a closed position (shown in FIG. 1). The closure 16 includes a latch finger 18 configured to be selectively grasped by the latching device 10.

Referring now to FIGS. 5-10, the latching device 10 includes various components, including, a sliding assembly 21 and a support housing 23. With specific reference to FIGS. 6, 8, 10, the sliding assembly 21 is movably supported by the support housing 23. More specifically, the support housing 23 defines a chamber 25. The sliding assembly 21 is movable linearly within the chamber 25 of the support housing 23 between a latched position 24, shown in FIGS. 5, 6, and 9, and an unlatched position 26, shown in FIGS. 7, 8, and 10. The sliding assembly 21 moves along a first axis 28, relative to the support housing 23 between the latched position 24 and the unlatched position 26.

Figure 4:
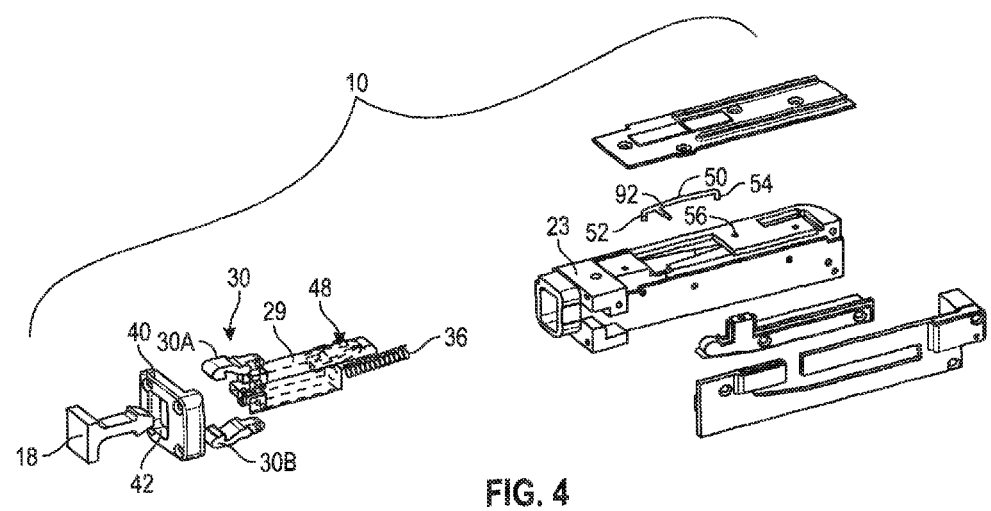
FIG. 4 is a schematic exploded perspective view of another embodiment of the latching device of FIGS. 1 and 2.
Figure 5:
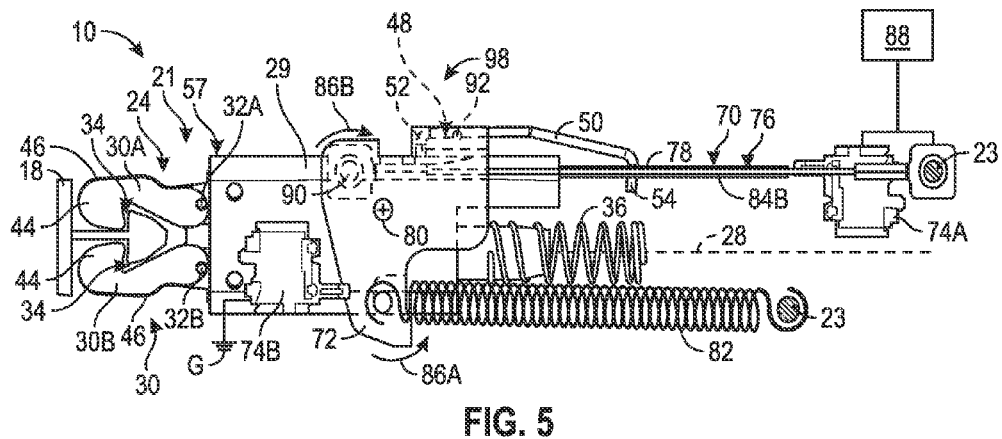
FIG. 5 is a schematic partial cross-sectional side view of the latching device of FIGS. 1-3 with the latching device in a latched position.
Figure 6:
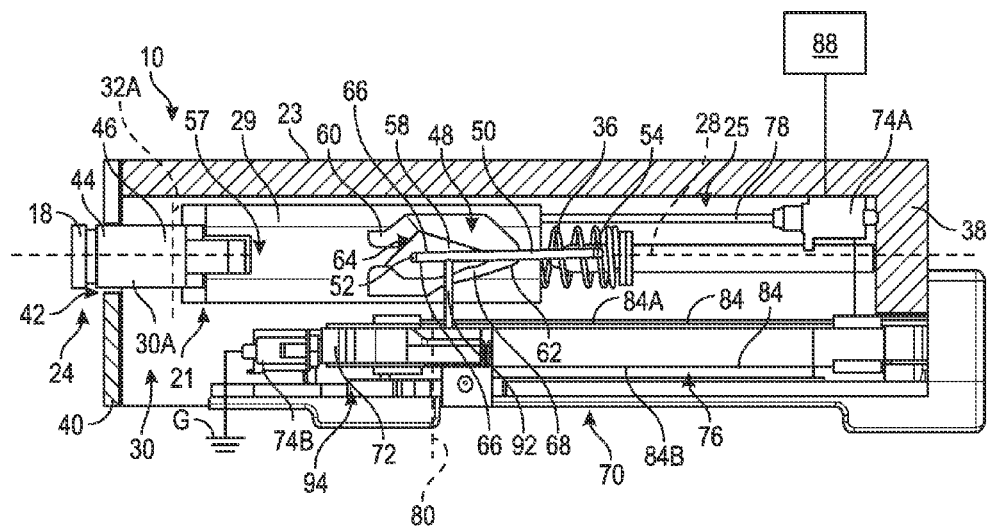
FIG. 6 is a schematic partial cross-sectional top view of the latching device of FIGS. 1-3 and 5 with the latching device in the latched position.
Figure 7:
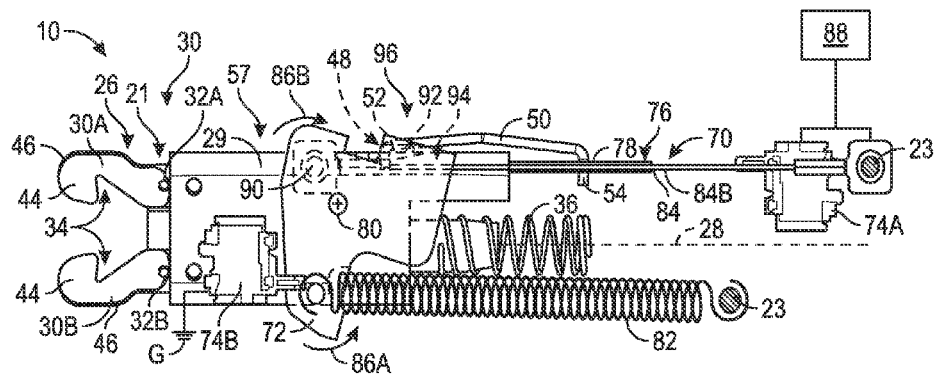
FIG. 7 is a schematic partial cross-sectional side view of the latching device of FIGS. 1-3 with the latching device in an unlatched position.
Figure 8:
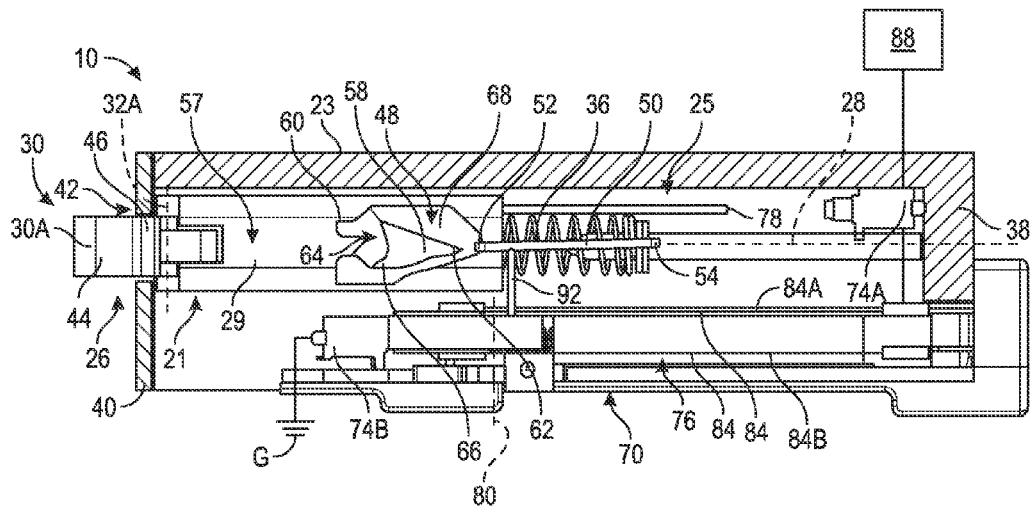
FIG. 8 is a schematic partial cross-sectional top view of the latching device of FIGS. 1-3 and 7 with the latching device in the unlatched position.
Figure 9:
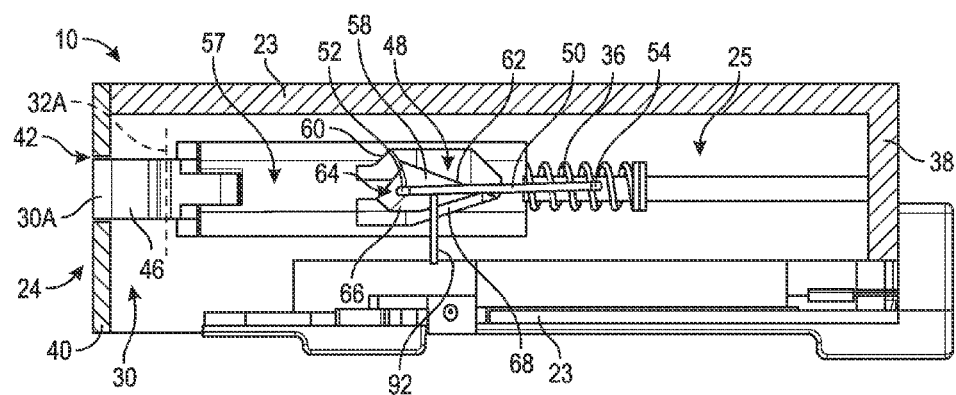
FIG. 9 is a schematic partial cross-sectional top view of the other latching device of FIG. 4 with the latching device in the latched position.

With reference to FIGS. 4-10, the sliding assembly 21 includes a slider 29 and a grasping mechanism 30. The grasping mechanism 30 is configured to move relative to the support housing 23 between the latched position 24 and the unlatched position 26. The grasping mechanism 30 is configured to grasp the latch finger 18 when the sliding assembly 21 is in the latched position 24, as illustrated in FIGS. 5, 6, and 9. Further, the grasping mechanism 30 is configured to release the latch finger 18 when the sliding assembly 21 is in the unlatched position 26. The grasping mechanism 30 may include a pair of tangs 30A, 30B that pivotably extend from the slider 29. The tangs 30A, 30B may be configured to grasp the latch finger 18 when the sliding assembly 21 is in the latched position 24 and be configured to release the latch finger 18 when the sliding assembly 21 is in the unlatched position 26. The tangs 30A, 30B are configured to pivot about a respective first pivot axis 32A, 32B between the latched position 24 and the unlatched position 26. The first pivot axes 32A and 32B are disposed in spaced and generally parallel relationship to one another. The tangs 30A, 30B may be spring-loaded. As such, the tangs 30A, 30B may be configured to be naturally biased (or naturally pivotable) into the unlatched position 26 of FIGS. 7, 8, and 10. As will be explained in more detail below, the tangs 30A, 30B are configured to pivot into the latched position 24 as the sliding assembly 21 moves along the first axis 28.

With specific reference to FIGS. 5 and 7, each tang 30A, 30B defines a recess 34. The tangs 30A, 30B are attached to the slider 29 such that the recesses 34 are disposed in opposition to one another. The recess 34 of each tang 30A, 30B is configured to receive a portion of the latch finger 18 when the slider 29 is in the latched position 24 such that the latch finger 18 is retained to the latching device by the tangs 30A, 30B, as illustrated in FIGS. 5 and 6.

Referring again to FIGS. 3-10, the support housing 23 includes a rear wall 38 and a restrictor flange 40 disposed in spaced and opposing relationship to the rear wall 38, along the first axis 28. The restrictor flange 40 defines an opening 42 and the tangs 30A, 30B are slidably disposed within the opening 42. As the tangs 30A, 30B move along the first axis 28, the tangs 30A, 30B are restricted by the restrictor flange 40 from naturally pivoting away from one another when the sliding assembly 21 is in the latched position 24. More specifically, the tangs 30A, 30B each include a first portion 44 and a second portion 46 disposed in linearly spaced relationship to the first portion 44, relative to the first axis 28. When the first portion 44 of the tangs 30A, 30B is positioned within the opening 42, the tangs 30A, 30B are prevented from naturally pivoting away from one another, about the respective axes 32A, 32B, and are maintained in the latched position 24. However, when the second portion 46 of the tangs 30A, 30B is positioned within the opening 42, the tangs 30A, 30B are no longer prevented or otherwise restricted from naturally pivoting away from one another. As such when the second portion of the tangs 30A, 30B is positioned within the opening 42, the tangs 30A, 30B automatically pivot into the unlatched position 26.

With continued reference to FIGS. 3-10, the sliding assembly 21 further includes a compression spring 36 operatively disposed within the chamber 25, between the slider 29 and the rear wall 38 of the support housing 23. As such, the compression spring 36 is configured to continually bias the slider 29 away from the rear wall 38, toward the restrictor flange 40. This means that the compression spring 36 is configured to continually bias the slider 29 into the unlatched position 24.

With continued reference to FIGS. 3-10, the sliding assembly 21 also includes a locking pin 50 and the slider 29 defines a channel 48. The locking pin 50 includes a first end 52 and a second end 54, disposed in spaced relationship to the first end 52. Referring to FIGS. 6 and 8, the first end 52 of the locking pin 50 is slidably disposed in the channel 48 and the second end 54 is pivotably disposed in a hole 56 defined in the support housing 23 (shown in FIGS. 3 and 4).

Referring to FIGS. 6 and 8-10, the channel 48 is defined in a surface 57 of the slider 29 between an island 58 and a border 60. The island 58 has a generally arrowhead or chevron shape that extends between a point 62 and a pair of wings 66, opposite the point 62. The wings 66 extend in diverging relationship to one another such that a cavity 64, having an arcuate shape or v-shape, is defined therebetween. The cavity 64 is defined as part of the channel 48. The point 62 is disposed between the wings 66 and the rear wall 38. The border 60 is shaped such that the first end 52 of the locking pin 50 is guided about the island 58 as the slider 29 is moved along the first axis 28. As such, as the slider 29 is moved from the unlatched position 26 of FIGS. 7, 8, and 10 to the latched position 24 of FIGS. 5, 6, and 9, the first end 52 of the locking pin 50 guided by a combination of the border 60, the periphery of the island 58, and a floor 68 of the cavity 64 such that the first end 52 is ultimately guided into the cavity 64 between the wings 66. Since the compression spring 36 is constantly biasing the slider 29 away from the rear wall 38, once the first end 52 is captured in the cavity 64, the sliding assembly 21 is maintained in the latched position 24. Likewise, in order to move the sliding assembly 21 out of the latched position 24, the first end 52 of the pin 50 is guided in a counterclockwise direction within the channel 48 from the cavity 64, around one of the wings 66 of the island 58, where the compression spring 36 biases the slider 29 away from the rear wall 38 such that the first end 52 of the pin 50 is maintained in the portion of the channel 48, proximate the point 62 of the island 58. More specifically the floor 68 of the cavity is configured to include slopes and other undulations which not only guide the first end 52 of the pin 50 along the channel 48, but which may also prevent the pin from travelling in an incorrect direction around the perimeter of the island 58. In the embodiment shown and described herein, the first end 52 of the pin 50 is configured to travel in a counterclockwise direction about the island 58. It should be appreciated however the pin 50 may be configured such that the first end 52 travels in a clockwise direction.

Figure 10:
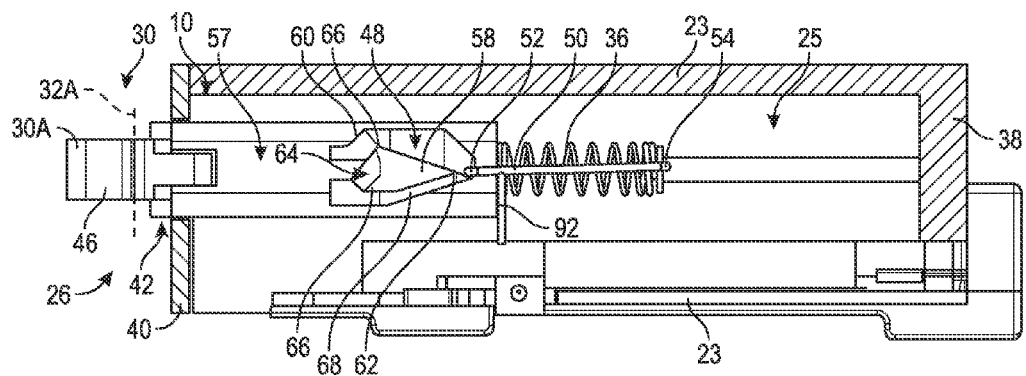
FIG. 10 is a schematic partial cross-sectional top view of the other latching device of FIGS. 4 and 9 with the latching device in the unlatched position.

The embodiment of the latching device 10 shown in FIGS. 4, 9, and 10, and described above, provides a latching device 10 that is selectively movable between the latched and unlatched positions 24, 26 to maintain the closure 16 in the latched position 24, as desired. Alternatively, the latching device 10 shown in FIGS. 3 and 5-8, and also described above, may further provide an actuating mechanism 70 that is configured to selectively lock the closure into the latched position 24 until the actuating mechanism 70 is actuated to allow the latching device 10 to move to the unlatched position 26. Further, as will be described in more detail below, the actuating mechanism 70 may be configured to be disposed within the confines of the same support housing 23 that is provided with the latching device 10 shown in FIGS. 4, 9, and 10. Accordingly, the actuating mechanism 70 is configured to take up very little space within the support housing 23, while providing flexibility when assembling the latching device 10 to the fuel housing 12. Therefore, latching device 10 may be provided in a first configuration, shown in FIGS. 4, 9, and 10, and/or a second configuration, shown in FIGS. 3 and 5-8, where the latching device 10 of the first configuration does not include the actuating mechanism 70. As such, a plurality of vehicles 10, each having the fuel assembly 14, where the fuel assembly 14 of one vehicle 10 may include the latching device 10 having the first configuration and another vehicle 10 may include the latching device 10 having the second configuration.

In the embodiments shown in FIGS. 5-8, the actuating mechanism 70 includes a lever 72, a first switch 74A, a second switch 74B, an actuator 76, an activator 78, and a return spring 82. The lever 72 is pivotably attached to the support housing 23. The lever 72 may be a generally flat plate that is disposed adjacent the slider 29 in generally perpendicular relationship to the surface 57 of the slider 29. The actuator 76 is operatively connected to the lever 72, the first switch 74A, and the second switch 74B. The actuator 76 may include at least one wire 84 that is operatively connected to the lever 72 and the support housing 23, proximate the rear wall 38. The wire 84, shown in FIGS. 5-8, is a pair of wires 84A, 84B, where each wire includes a shape memory alloy (SMA) such that the wires 84 are a first SMA wire 84A and a second SMA wire 84B, which will be described in more detail below.

The lever 72 is configured to pivot about a second pivot axis 80, relative to the support housing 23. The return spring 82 operatively extends between the lever 72 and the support housing 23, proximate the rear wall 38. The return spring 82 is attached to the lever 72 in spaced relationship to the second pivot axis 80. Likewise, the first and second SMA wires 84A, 84B are attached to the lever in spaced relationship to each of the second pivot axis 80 and the return spring 82. The return spring 82 is configured to apply a constant torque to the lever 72 in a first direction of rotation 86A. When the SMA wires 84A, 84B are activated, the SMA wires 84A, 84B heat up, which causes a length of each SMA wire 84A, 84B to decrease. As the length of each SMA wire 84A, 84B decreases, a torque is applied to the lever 72 in the second direction of rotation 86B, opposite the first direction of rotation 86A.

With continued reference to FIGS. 5-8, the first switch 74A is operatively connected to a controller 88, such as a body control module (BCM), and the second switch 74B is operatively connected to a ground G. When the first switch 74A is activated, the controller 88 sends electrical current through the first SMA wire 84A, which then travels from the first SMA wires 84A to the second SMA wire 84B, via a conductor 90 disposed on the lever 72. The current then travels from the SMA wire 84B to the second switch 74B and from the second switch 74B to ground G. The current causes the first and second SMA wires 84A, 84B to heat up. However, it should be appreciated that more or less SMA wires may be used. By way of a non-limiting example, only one continuous SMA wire 84 may replace the first and second SMA wires 84A, 84B. As such, the single SMA wire would wrap about the lever 72, thus replacing the need for the conductor 90. The SMA wire has a crystallographic phase changeable between austenite and martensite in response to heat generated.

As used herein, the terminology "SMA" (SMA) refers to alloys that exhibit a shape memory effect. That is, the SMA member may undergo a solid state, crystallographic phase change via a shift between a martensite phase, i.e., "martensite", and an austenite phase, i.e., "austenite." The Martensite phase is a relatively soft and easily deformable phase of the shape memory alloys, which generally exists at lower temperatures. The Austenite phase, the stronger phase of shape memory alloys, occurs at higher temperatures. The temperature at which the shape memory alloy remembers its high temperature form, referred to as the phase transformation temperature, can be adjusted by applying stress and other methods. Accordingly, a temperature difference between the Austenite phase and the Martensite phase may be the phase transformation delta T. Alternatively stated, the SMA member may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable— i.e., Young's modulus is approximately 2.5 times lower— than the comparatively higher-temperature austenite phase.

The temperature at which the SMA member begins to change from the austenite phase to the martensite phase is known as the martensite start temperature, $M_s$. The temperature at which the SMA member completes the change from the austenite phase to the martensite phase is known as the martensite finish temperature, $M_f$. Similarly, as the SMA member is heated, the temperature at which the SMA member begins to change from the martensite phase to the austenite phase is known as the austenite start temperature, $A_s$. The temperature at which the SMA member completes the change from the martensite phase to the austenite phase is known as the austenite finish temperature, $A_f$.

Therefore, the SMA wires 84A, 84B may be characterized by a cold state, i.e., when a temperature of the SMA member is below the martensite finish temperature $M_f$ of the SMA wire 84A, 84B. Likewise, the SMA wire 84A, 84B may also be characterized by a hot state, i.e., when the temperature of the SMA wire 84A, 84B is above the austenite finish temperature $A_f$ of the SMA wire 84A, 84B.

In operation, the SMA wire 84A, 84B that is pre-strained or subjected to tensile stress can change dimension upon changing crystallographic phase to thereby convert thermal energy to mechanical energy. That is, the SMA wire 84A, 84B may change crystallographic phase from martensite to austenite and thereby dimensionally contract if pseudoplastically pre-strained so as to convert thermal energy to mechanical energy. Conversely, the SMA wire 84A, 84B may change crystallographic phase from austenite to martensite and if under stress thereby dimensionally expand and be stretched.

Pseudoplastically pre-strained refers to stretching of the SMA wire 84A, 84B while in the martensite phase so that the strain exhibited by the SMA wire 84A, 84B under that loading condition is not fully recovered when unloaded, where purely elastic strain would be fully recovered. In the case of the SMA wire 84A, 84B, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the SMA wire 84A, 84B transforms to its austenite phase, that strain can be recovered, returning the SMA wire 84A, 84B to the original length observed prior to application of the load.

Referring again to FIGS. 5-8, the locking pin 50 includes a perpendicularly extending finger 92 that is disposed in generally perpendicular relationship to the first axis 28. The finger 92 is configured to first engage a hole (not shown) in the lever 72 when the slider 29 is in the latched position 24. The finger 92 is configured to remain engaged with the hole and travel along a ramped ledge 94 in the lever 72, shown in phantom in FIGS. 5 and 7, where the finger 92 remains in the hole while in the unlatched position 26. The finger 92 exits the hole as the locking pin 50 is caused to pivot at the second end 54, relative to the slider 29, as the first end 52 is guided along the channel 48 between the island 58 and the border 60.

Referring again to FIGS. 5 and 6, when the sliding assembly 21 is in the latched position 24 and the SMA wires 84A, 84B are deactivated, i.e., not receiving current, the return spring 82 maintains the lever 72 in a first position 98. When the lever 72 is in the first position 98, the finger 92 is positioned on the ramped ledge 94 such that the first end 52 of the locking pin 50 is kept off of the floor 68 of the cavity 48. As such, the first end 52 of the locking pin 50 is prevented from moving out of the cavity 64. Referring to FIGS. 5 and 6, the activator 78 extends from the slider 29 such that the activator 78 is disposed between the slider 29 and the first switch 74A.

Referring to FIGS. 5 and 6, the activator 78 may be a rod that moves longitudinally along the first axis 28 with the slider 29. When the latching device 10 is in the latched position 24 and the sliding assembly 21 is longitudinally depressed along the first axis 28, the activator 78 contacts the first switch 74A to activate the SMA wires 84A, 84B.

When the SMA wires 84A, 84B are activated, the lever 72 rotates in a clockwise position from the first position 98 to a second position 96, thus overcoming the torque applied by the return spring 82. Once the lever 72 is in the second position 96, the first end 52 of the locking pin 50 is effectively allowed to lower into the contact with the floor 68 of the cavity 64, whereby the first end 52 of the locking pin 50 can be selectively moved out of the cavity 64, along the channel 48, and into the unlatched position 26. However, if power is not supplied to the first switch 84A, i.e., the vehicle is in an off state, and the like, then current is not sent to the SMA wires 84A, 84B and the latching device 10 will remain in the latched position 24 until power is supplied.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of assembling a plurality of latching devices, the method comprising:
 maintaining an inventory of identical support housings, wherein each of the support housings define a chamber;
 assembling a first latching device including:
  a first support housing, selected from the inventory of identical support housings; and
  a first sliding assembly movably supported by the first support housing;
  wherein the first sliding assembly is selectively movable, within the chamber of the first support housing, between a latched position and an unlatched position; and
 assembling a second latching device including:
  a second support housing, selected from the inventory of identical support housings;
  a second sliding assembly movably supported by the second support housing;
  wherein the second sliding assembly is selectively movable, within the chamber of the second support housing, between a latched position and an unlatched position; and
  an actuating mechanism operatively disposed in the second support housing and configured to selectively maintain the second sliding assembly of the second latching device in the latched position until the actuating mechanism is selectively actuated;
  wherein the actuating mechanism includes an actuator configured to be selectively actuated;
  wherein the actuator includes at least one shape memory alloy (SMA) wire that includes an SMA;
  wherein a length of the SMA wire is configured to increase when the SMA is activated to actuate the actuator;
  wherein the length of the SMA wire is configured to decrease when the SMA is deactivated to not actuate the actuator;
  wherein the second sliding assembly is prevented from being selectively moved from the latched position to the unlatched position when the SMA is deactivated;
  wherein the second sliding assembly is allowed to be selectively moved from the latched position to the unlatched position when the SMA is activated; and
  wherein the configuration of the first latching device does not include the actuating mechanism.

2. A method of providing a selective configuration of a latching device, the method comprising:

maintaining an inventory of components including a plurality of support housings, a plurality of sliding assemblies, and an actuating mechanism;

wherein the plurality of support housings are substantially identical to one another;

wherein one of the plurality of support housings is configurable in a first configuration to provide a first latching device and another one of the plurality of support housings is configurable in a second configuration to provide a second latching device;

wherein the actuating mechanism includes an actuator configured to be selectively actuated;

wherein the actuator includes at least one shape memory alloy (SMA) wire that includes an SMA;

wherein a length of the SMA wire is configured to increase when the SMA is selectively activated to actuate the actuator such that the second sliding assembly is allowed to move from the latched position to the unlatched position;

wherein a length of the SMA wire is configured to decrease when the SMA is selectively deactivated to not actuate the actuator such that the second sliding assembly is prevented from moving from the latched position to the unlatched position;

wherein in the first configuration of the first latching device, the one of the plurality of support housings is configured to receive one of the plurality of sliding assemblies such that the one of the plurality of sliding assemblies is movable, relative to the one of the plurality of support housings, between a latched position and an unlatched position;

wherein in the second configuration of the second latching device, the another one of the plurality of support housings is configured to receive:
  another one of the plurality of sliding assemblies such that the another one of the plurality of sliding assemblies is movable, relative to the another one of the plurality of support housings, between the latched position and the unlatched position; and
  the actuating mechanism such that the actuating mechanism is configured to selectively maintain the another one of the plurality of sliding assembly in the latched position until the actuating mechanism is selectively actuated; and wherein the first configuration of the first latching device does not include the actuating mechanism.

3. The method, as set forth in claim 2, wherein any of the plurality of support housings is configurable in any of the first configuration to provide the first latching device and the second configuration to provide the second latching device.

* * * * *